United States Patent [19]
Zimmerman et al.

[11] Patent Number: 5,789,722
[45] Date of Patent: Aug. 4, 1998

[54] MODULAR MULTIZONE HEATER SYSTEM AND METHOD

[75] Inventors: Daniel Zimmerman, St-Paul de Châteauguay; Leo Corbeil, Howick, both of Canada

[73] Assignee: Zimac Laboratories, Inc., Quebec, Canada

[21] Appl. No.: 747,336

[22] Filed: Nov. 12, 1996

[51] Int. Cl.[6] ..................................... H05B 1/02
[52] U.S. Cl. ................... 219/486; 219/483; 219/205; 219/526; 219/544; 219/505; 156/94; 156/359; 156/382
[58] Field of Search ................... 219/202, 205, 219/209, 526, 528, 536, 549, 210, 477, 483–486, 497, 505, 506, 544; 156/94, 359, 382, 285

[56] References Cited

U.S. PATENT DOCUMENTS

| | | | |
|---|---|---|---|
| 2,003,028 | 5/1935 | Zaiger | 219/202 |
| 3,875,373 | 4/1975 | Lowery et al. | 219/469 |
| 4,352,707 | 10/1982 | Wengler et al. | 156/359 |
| 4,399,347 | 8/1983 | Schmidtt | 219/203 |
| 4,402,185 | 9/1983 | Perchak | 62/3 |
| 5,260,548 | 11/1993 | Todd et al. | 219/483 |
| 5,449,883 | 9/1995 | Tsuruta | 219/483 |
| 5,549,155 | 8/1996 | Meyer, IV et al. | 165/104.33 |
| 5,550,350 | 8/1996 | Barnes | 219/213 |
| 5,573,690 | 11/1996 | Nobori et al. | 219/457 |

*Primary Examiner*—Mark H. Paschall
*Attorney, Agent, or Firm*—Nikaido, Marmelstein, Murray & Oram LLP

[57] ABSTRACT

The modular multizone heater system is for controllably heating areas of a structure, for example for bonded doubler reparation. The system comprises a number of heater cells to be placed in thermal contact with the areas to be heated of the structure. Each heater cell has a heating element and a temperature sensor. The heating elements of the heater cells are connected to a heater power supply to receive electric power. The heater power supply is controlled by a control unit receiving control data from a computer. The temperature sensors of the heater cells are connected to the control unit that relays the temperature data produced by the temperature sensors to the computer for monitoring, processing and control purposes.

15 Claims, 3 Drawing Sheets

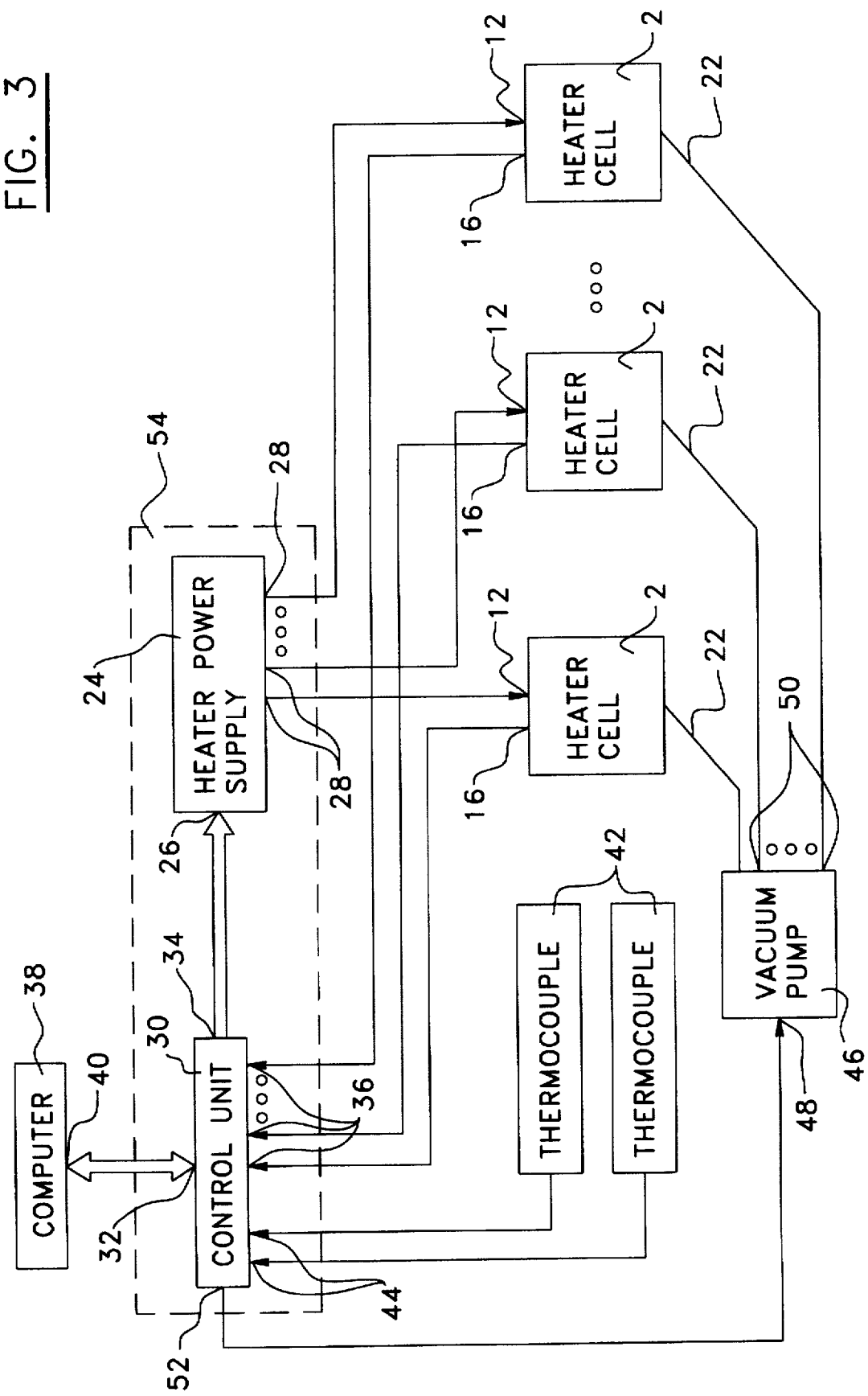

MODULAR MULTIZONE HEATER SYSTEM AND METHOD

FIELD OF THE INVENTION

This invention relates in general to heat treatments of areas of a structure, and more particularly to a method and a system for controllably heating areas or zones of a structure, a heater cell and a control module therefor. Such a system and method are especially suitable for bonded doubler reparation of aerospace structures.

BACKGROUND OF THE INVENTION

Sections of an aircraft are subjected to structural deficiencies or structural damages caused by foreign objects that come into contact with the structure during flight or other operations. Reinforcement may be brought to correct the deficiencies or damages sustained by the sections. There exists composite materials for this purpose, namely graphite and boron as well as others, that exhibit great cross sectional strengths and/or shear strength (depending on the warp and fill of the material (i.e. weave properties)) when impregnated with hi-strength epoxies that cure at elevated temperatures. These composites are cut and laid up in feathered stacks, the thickness of which depends on location to which it will be applied and subsequently bonded, hence the phrase "bonded doubler".

So far, a heater blanket is spread over the bonded doubler to provide the heat required to cure the epoxy of the bonded doubler. Many drawbacks result from the use of such a blanket. For example, it may be difficult to spread adequately the blanket over the bonded doubler in the case of a complex structure exhibiting irregular shapes. Temperature stability is a key issue in the process because without it, the process can be compromised due to the inherent likelihood of residual stresses forming as a result of uneven heating throughout the bonded doubler during the curing process. Overheating could prematurely age the underlying structure with the result being a weakened section of structure, whereas underheating could impair the curing process of the epoxy with the result being an inadequate structure repair.

The required temperature stability is very hard to obtain with a heater blanket as it may be difficult to position and spread it properly around the area(s) to be heated of the structure. Furthermore, it may be time consuming to determine the proper installation of the blanket over the bonded doubler, and it may require the use of physical insulation. Also, since the heat provided by such a blanket is the same throughout its extent, it may be hard and even impossible to repair structures having areas exhibiting different heat absorption properties.

SUMMARY OF THE INVENTION

Therefore, one object of the present invention is to provide a method and a system for controllably heating areas of a structure, which overcome the drawbacks of the prior art devices.

A subsidiary object of the invention is to provide such a method and system, whereby a detailed thermal profile of the areas to be heated of the structure can be obtained.

A subsidiary object of the invention is to provide such a method and system, whereby heat surveys can be carried out before the installation of a bonded doubler on a structure.

A subsidiary object of the invention is to provide such a method and system, which perform an accurate temperature control over the areas to be heated of the structure, for temperature stability purposes.

The system according to the present invention comprises:

a heater cell including:
- a heat conductive block having an underside;
- a heating element mounted in the block, the heating element being in thermal contact with the block and having an electric connector extending outside the block to receive electric power;
- a temperature sensor mounted in the block, the temperature sensor being in thermal contact with the block and having a connector extending outside the block to provide temperature data relative to the block; and
- means for detachably securing the block on the structure so that the underside of the block gets and remains in thermal contact with the area to be heated of the structure;

heater power supply means for supplying the electric power to the heating element of the heater cell in response to a control signal, the power supply means having an input to receive the control signal, and an output connected to the electric connector of the heating element;

control means for operating the heater power supply means based on control data and for relaying the temperature data provided by the temperature sensor, the control means having an input/output port for receiving the control data and transmitting the temperature data, an output connected to the input of the heater power supply means to transmit the control signal thereto depending on the control data, and an input connected to the connector of the temperature sensor of the heater cell to receive the temperature data therefrom; and computer means for processing the temperature data and instructing the control means based on preprogrammed instructions in respect with the temperature data, the computer having an input/output port connected to the input/output port of the control means to receive the temperature data therefrom and transmit the control data thereto according to the preprogrammed instructions.

The system may further comprise additional heater cells identical to said heater cell, to heat other areas of the structure. In such a case, the heater power supply means have additional outputs connected to the electric connectors of the heating elements of the additional heater cells to supply electric power thereto in response to respective additional control signals, the input of the heater power supply means being configured to receive the additional control signals. Furthermore, the control means have additional inputs connected to the connectors of the temperature sensors of the additional heater cells to receive the temperature data therefrom, the output of the control means being configured to transmit the additional control signals to the input of the heater power supply means depending on the control data, and the input/output port being configured to transmit the additional temperature data. Also, the input/output port of the computer means is configured to receive the additional temperature data from the input/output port of the control means.

The method according to the invention comprises the steps of:

placing a heater cell in each area, the heater cell including:
a heat conductive block having an underside;

a heating element mounted in the block, the heating element being in thermal contact with the block and having an electric connector extending outside the block to receive electric power;

a temperature sensor mounted in the block, the temperature sensor being in thermal contact with the block and having a connector extending outside the block to provide temperature data relative to the block; and means for detachably securing the block on the structure so that the underside of the block gets and remains in thermal contact with the area to be heated of the structure;

monitoring the temperature data provided by each heater cell;

comparing the temperature data with desired temperatures values for the areas respectively; and supplying the electric power to the heating elements of the heater cells individually depending on whether the temperature data represent temperatures lower than the desired temperature values for the areas as a result of the step of comparing.

According to the invention, there is also provided a heater cell for heating an area of a structure, comprising:

a heat conductive block having an underside;

a heating element mounted in the block, the heating element being in thermal contact with the block and having an electric connector extending outside the block to receive electric power;

a temperature sensor mounted in the block, the temperature sensor being in thermal contact with the block and having a connector extending outside the block to provide temperature data relative to the block; and means for detachably securing the block on the structure so that the underside of the block gets and remains in thermal contact with the area to be heated of the structure.

Preferably, the means for detachably securing comprise:

a heat conductive pad having opposite top and bottom surfaces and a hole extending from the top surface to the bottom surface to form a vacuum chamber; and a vacuum channel having an opening in the underside of the block for communication with the vacuum chamber, the vacuum channel being in communication with a tube extending outside the cell to receive a vacuum pressure causing the cell to adhere to the pad and the pad to adhere to the structure by suction.

In such a case, the system according to the invention may further comprises a vacuum pump having an input for receiving a vacuum control signal, and vacuum ports to produce vacuum pressures in response to the vacuum control signal. The control means have a vacuum control output to produce the vacuum control signal according to the control data, and the computer means is configured to operate the vacuum pump via the control means according to the preprogrammed instructions setting the control data.

According to the invention, there is also provided a module for controlling heater cells provided with heating elements and temperature sensors, comprising:

heater power supply means for supplying electric power to the heating elements of the heater cells in response to respective control signals, the power supply means having an input to receive the control signals, and outputs for connection to the heating elements, to supply the electric power to the heating elements as a function of the respective control signals; and control means for operating the heater power supply means based on control data and for relaying temperature data provided by the temperature sensors, the control means having an input/output port for receiving the control data and transmitting the temperature data, an output connected to the input of the heater power supply means to transmit the control signals thereto depending on the control data, and an input for connection to the temperature sensors of the heater cells to receive the temperature data therefrom.

BRIEF DESCRIPTION OF THE DRAWINGS

A detailed description of preferred embodiments of the invention will be given herein below with reference to the following drawings, in which like numbers refer to like elements:

FIG. 3 is a schematic diagram of a system according to the invention.

DETAILED DESCRIPTION OF PREFERRED EMBODIMENTS

Figure 1:
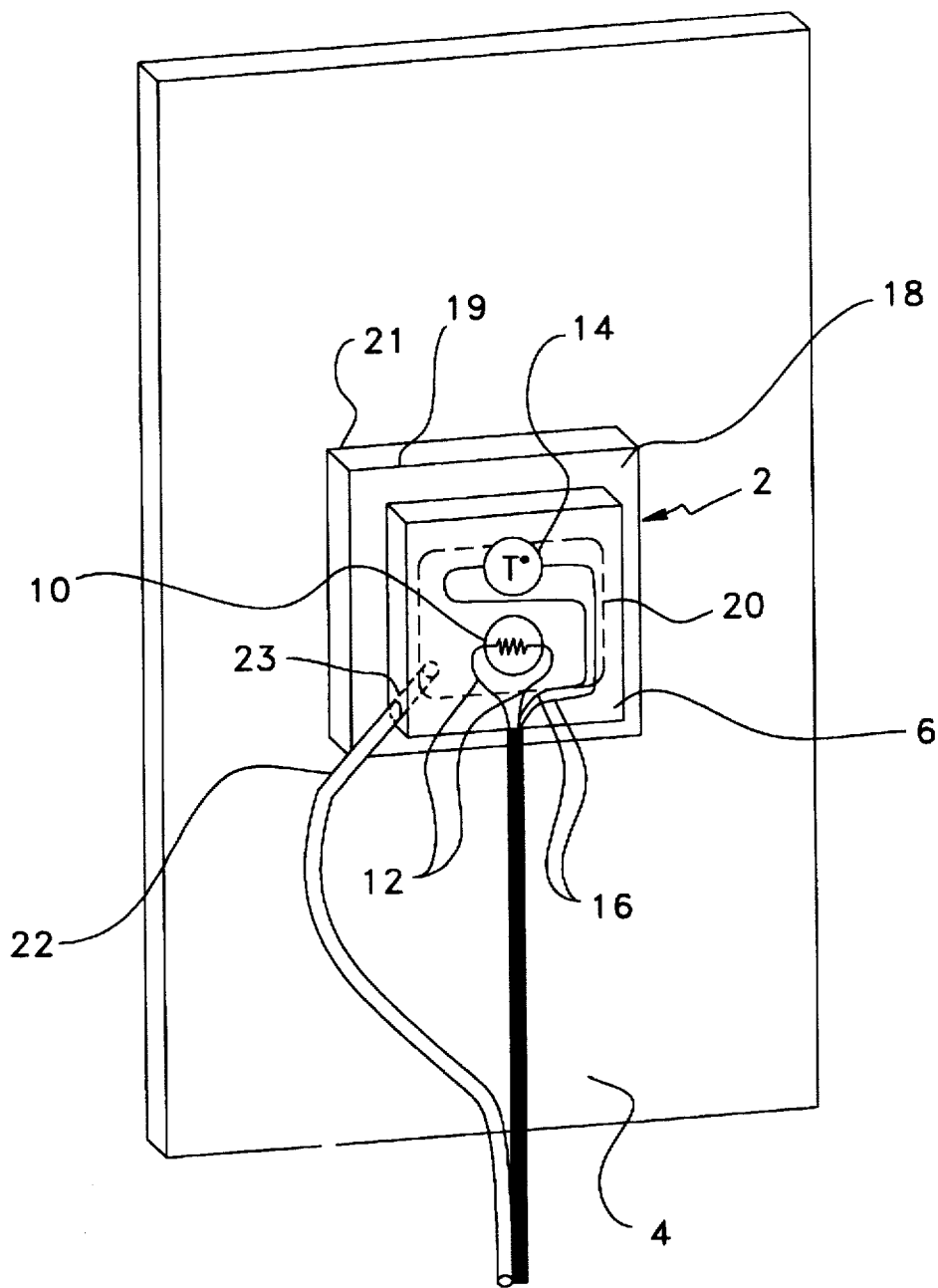
FIG. 1 is a cross section view of a heater cell according to the invention, mounted on an area of a structure.

Referring to FIG. 1, there is shown a cross section view of a heater cell 2 according to the invention, for heating an area of a structure 4. The heater cell 2 comprises a heat conductive block 6 having an underside 8 (shown in FIG. 2). A heating element 10 is mounted in the block 6. The heating element 10 is in thermal contact with the block 6 and has an electric connector 12 extending outside the block 6 to receive electric power. A temperature sensor 14 is also mounted in the block 6. The temperature sensor 14 is in thermal contact with the block 6 and has a connector 16 extending outside the block 6 to provide temperature data relative to the block 6. A clamp or any other suitable device (not shown in the Figures) can be used to detachably secure the block 6 on the structure 4 so that the underside 8 of the block 6 gets and remains in thermal contact with the area to be heated of the structure 4.

Conveniently, instead of using a clamp, the heater cell 2 may be provided with a heat conductive pad 18 to assist in a self adhesive feature of the heater cell 2. The pad 18 has opposite top and bottom surfaces 19, 21 and a hole (depicted by the dashed line 20 extending from the top surface 19 to the bottom surface 21 to form a vacuum chamber. The block 6 is provided with a vacuum channel 23 (in dashed lines) having an opening in the underside 8 of the block 6 for communication with the vacuum chamber. The vacuum channel 23 is in communication with a tube 22 extending outside the pad 18 to receive a vacuum pressure causing the cell 2 to adhere to the pad 18 and the pad 18 to adhere to the structure 4 by suction. Preferably, the pad 18 is made of a compliant material to conform with the profile of the structure (and the underside 8 of the block 6).

Figure 2:
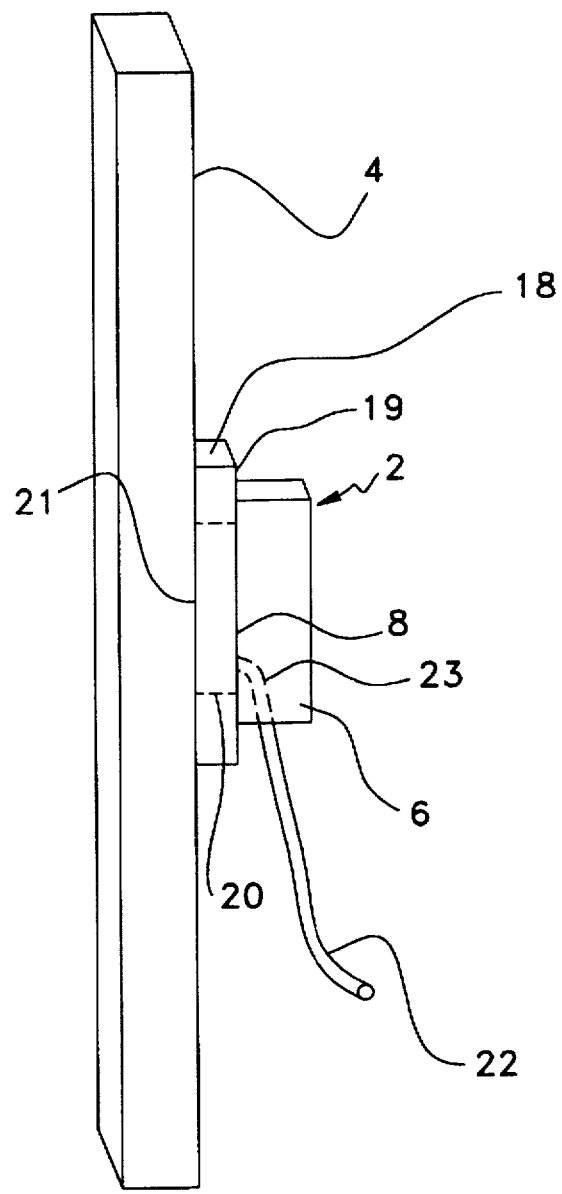
FIG. 2 is a side elevation view of a heater cell according to the invention, mounted on an area of a structure.

The heating element 10 can be conveniently formed of a resistor or a set of resistors. As shown in FIGS. 1 and 2, the block 6 has a substantially square thin shape. However, other shapes could be used, e.g. a curved shape to adapt with structures having curved areas. The block can be made from metal or other suitable thermally conductive material.

The electric connector 12, the connector 16 and the tube 22 can be bundled together. The heater cell 2 can be provided with a dedicated ground wire (not shown in the Figures) also bundled with the connectors 12, 16 and the tube 22.

Referring to FIG. 3, there is shown a heater system according to the invention, for controllably heating areas (or zones) of a structure (not shown in the Figure). The heater system comprises a number of heater cells 2 like those hereinabove described, to heat the areas respectively. The electric power required by the heating element of each heater cell 2 is provided in an independent fashion by means of a heater power supply 24 responsive to control signals. The heater power supply 24 has an input 26 configured to receive the control signals, and outputs 28 connected to the electric connectors 12 of the heating elements of the heater cells 2, to provide the electric power thereto in response to the respective control signals. Thus, the first control signal controls the electric power supplied to the heater cell 2 connected to the first output 28 of the heater power supply 24, the second control signal controls the electric power supplied to the heater cell 2 connected to the second output 28 of the heater power supply 24, and so on for the other control signals and outputs 28 of the heater power supply 24.

A control unit 30 operates the heater power supply 24 and relays the temperature data provided by the temperature sensors of the heater cells 2. The control unit 30 has an input/output port 32 for receiving the control data and transmitting the temperature data, an output 34 connected to the input 26 of the heater power supply 24 to transmit the control signals thereto depending on the control data, and inputs 36 connected to the connectors 16 of the temperature sensors of the heater cells 2 to receive the temperature data therefrom.

A computer 38 processes the temperature data and instruct the control unit 30 based on preprogrammed instructions in respect with the temperature data. The computer 38 has an input/output port 40 connected to the input/output port 32 of the control unit 30 to receive the temperature data therefrom and transmit the control data thereto according to the preprogrammed instructions.

In the case where there is more heater cells 2 than the number of outputs 28, some of the heater cells 2 can be connected to the same output 28, provided that the capacity of the heater power supply 24 is not exceeded. The system is modular since the number of heater cells 2 and the extent of the covered part of the structure can vary.

The computer 38 can be programmed to perform the heating control of the heater cells 2 in many ways. For example, the preprogrammed instructions may carry out comparisons between the temperature data provided by the heater cells 2 and respective preset desired temperature values for the areas, and produce the control data to cause the control unit 30 to produce the control signals when the temperature data represent temperatures lower than the desired temperature values.

The system may be provided with additional temperature sensors like thermocouples 42 to provide additional temperature data relative to the areas or adjacent areas thereto. In such a case, the control unit 30 has second inputs 44 to receive the additional temperature data from the additional temperature sensors. The input/output port 32 of the control unit 30 is configured to transmit the additional temperature data provided by the additional temperature sensors to the computer 38. The input/output port 40 of the computer 38 is configured to receive the additional temperature data derived from the additional temperature sensors for processing by the computer 38.

In the case where the heater cells 2 have vacuum securing pads 18 as hereinabove described, the system may be provided with a vacuum pump 46 having an input 48 for receiving a vacuum control signal, and vacuum ports 50 to produce vacuum pressures in response to the vacuum control signal. The tubes 22 (as shown in FIGS. 1 and 2) of the heater cells 2 are connected to the vacuum ports 50 of the vacuum pump 46 to receive the vacuum pressure therefrom causing the pads to adhere to the structure by suction. The control unit 30 has a vacuum control output 52 to produce the vacuum control signal according to the control data. The computer 38 is configured to operate the vacuum pump 46 via the control unit 30 according to the preprogrammed instructions setting the control data.

The control unit 30 and the heater power supply can conveniently be grouped in a module 54 for controlling heater cells 2 like those hereinabove described or other heater cells provided with heating elements and temperature sensors.

It should be understood that functional equivalents to the computer 38, the control unit 30 and the heater power supply 24, and to elements thereof can be used without departing from the invention. For example, the input/output ports 32, 40 of the control unit 30 and the computer 38 can be formed by a functional equivalent consisting of separate inputs and outputs for both the control unit 30 and the computer 38. The heater power supply 24 may, if desired, be integrated in the control unit 30.

According to the invention, the method of controllably heating areas of a structure comprises the steps of placing a heater cell 2 like the one hereinabove described in each area to be heated, monitoring the temperature data provided by each heater cell 2; comparing the temperature data with desired temperatures values for the areas respectively, and supplying the electric power to the heating elements 16 of the heater cells 2 individually depending on whether the temperature data represent temperatures lower than the desired temperature values for the areas as a result of the step of comparing.

The areas may be all adjacent or close to one another, so that the heater cells 2, once positioned, form a grid-like pattern. Some of the areas may even intersect with others.

Each heater cell 2 can be placed at a desired location on the structure and laid up in such a way so as to cover every square inch of the affected part of the structure. It can also be strategically placed to cover only specific areas of the affected part or randomly placed. In any case, a thermal profile of the underlying geometry can be obtained by analyzing the temperature data generated by the temperature sensors 14 from each heater cell 2 as the underlying structure absorbs the heat produced by each heater cell 2. The additional sensors 42 located elsewhere in the affected part also aid in this exercise by providing additional temperature data from their locations.

A feature of the system consists in the ability to influence heat dissipation throughout a given structure part by simulating insulation through the setting of appropriate values for each heater cell 2. This can be achieved by operating one or more selected heater cells 2 at an elevated temperature so as to inhibit temperature fluctuations of the affected part by dissipation of the heat through the structure.

Also, the heater cells 2 can be grouped to reference any number of temperature sensors 14, 42, all could reference one, all could have their own temperature sensor 14 or any combination of the above.

The computer 38 included in the system is responsible for processing all the temperature data generated by the temperature sensors 14, 42, and subsequently switching the heater cells 2 "ON" or "OFF" depending on the preprogrammed instructions. The computer 38 can be programmed to view on demand the temperature data as they are received by the computer 38, or logged the temperature data to disk (fixed or removable). With a printer (not shown) connected to the computer 38, the temperature data can also be printed at any time during or after the event has taken place. The computer 38 can be programmed to retrieve the temperature data in as much or as little detail as required.

The following describes examples of applications of the invention.

When a part of a structure is slated for an installation of a bonded doubler, the first step of the process is to perform a heat survey to expose the heat absorption characteristics of the underlying geometry.

There is a significant possibility that the heater cells 2 cannot be affixed directly over the part to which the bonded doubler is to be affixed, although, in other situations the heater cells 2 can be directly above the affected part. In order for the temperature of the affected part to be raised in the prescribed manner, as dictated by the specifications drawn up by the manufacturer of the epoxy, aircraft or regulatory body, the heater cells 2 should reference the thermocouples 42 affixed to the affected part.

While the heater cells 2 heat at the programmed rate (as determined by the software values entered in the computer 38 at the start of the heat survey and the preprogrammed instructions), the heat produced is transferred through the underlying structure thereby affecting the temperature readings from the remote thermocouples 42. As well, each heater cell 2 is constantly monitored for its own temperature and compared with programmed values while it strives to provide the necessary heat to the nearby or distant location.

In a situation where the heater cells 2 are directly above the part having the bonded doubler installed, the process for the heat survey is similar. However, for the actual installation of the bonded doubler, it is not possible to have thermocouples 42 affixed to the affected region due to the fact that the thermocouples 42 would interfere with the installation process, so the installation proceeds based on the results of a successful heat survey performed previously. The thermocouples or temperature sensors 14 (as shown in FIG. 1) embedded within the heater cell block 6 still function and keep the heater cell(s) 2 to within programmed parameters. The other thermocouples 42 placed close to the affected part gather temperature data or act as reference thermocouples, depending on what is deemed necessary by the successful heat survey. All the heater cells 2 can be arranged in close proximity to the part requiring uniform heating so as to effectively cure the epoxy impregnated in the composite material.

The present system permits to carry out a heat survey according to the following method steps:

Covering the repair area in question with heater cells 2 and subsequently heating all the heater cells 2 to the same temperature for a short period of time and then turning them all off simultaneously. The heatsink geometry can then be deduced by logging the temperature data of the individual heater cells 2 as they fall in temperature. These data can then be graphed to view the difference in rate of temperature drop among the heater cells 2 involved, which, in turn would indicate the area or areas of the greatest heat dissipation. This information can then be used with confidence to set the program values for the bonded doubler installation. This process has the opportunity of offering increased reliability and shorter process time for the heat survey operation.

A test of the system has been performed in Canada on a CF 18 aircraft on September 1996 under the direction of the National Research Council (NRC) of Canada, in all confidentiality and secrecy. To set up for a heat survey on the CF18, the best location for the heater cells 2 has been simply estimated and ten heater cells 2 were affixed with C clamps in and around the Y470 section of the aircraft. In the engine air inlet duct, six heater cells 2 have been positioned in and around the part above the section which was to be profiled in advance of a bonded doubler installation.

The system was configured with values so that all of the heater cells 2 would not heat any one area in excess of 270° F. The reason for this is because at temperatures above this value, the underlying aluminum can age with the result being a weakened section of structure.

The target temperature for the Y470.5, X19 pocket area was pre-established by the NRC at 185° F. prior to the heat survey.

Six heater cells 2 and three reference thermocouples 42 were placed on the outside edges of the pocket area. This placement was to provide very accurate temperature regulation of the pocket area. Two additional heater cells 2 were positioned both to the right and left of the pocket area. These heater cells 2 were referenced to two additional thermocouples 42 (two heater cells 2 per left thermocouple 42 and two heater cells 2 per right thermocouple 42). These heater cells 2 provided a thermal dam which prevented the bleed off of heat from the pocket area heater cells 2. In addition to these ten heater cells 2, six additional heater cells 2 were used to provide peripheral preheating of the massive metal cross-sections further from the pocket area. These heater cells 2 were positioned in two groups; each group was comprised of three heater cells 2 and one reference thermocouple 42.

In the Y470.5X19 pocket, there were five thermocouples 42 placed for monitoring purposes and with these thermocouples 42, it was possible to observe the temperature stability or instability throughout the pocket by viewing the output on the computer screen as the heat survey progressed.

The result of the heat survey was temperature stability across the pocket region of ±2° F. which was viewed as an astounding success, notwithstanding the fact that it was completed without any physical insulation of any kind. Temperature stability is viewed as a key issue, because, without it, the process can be compromised due to the inherent likelihood of residual stresses forming due to uneven heating throughout the bonded doubler during the curing process.

During the initial heat survey, the temperature data generated by the temperature sensors 14 of the heater cells and the reference and monitor thermocouples 42 can be viewed on the computer screen as the temperature data are being logged. If the resultant temperature profiles are deemed unsatisfactory, the heat survey can be terminated, adjustments made to the positioning of either the heater cells 2 or reference thermocouples 42 as well as adjustments to the program values to compensate for the new information obtained from the terminated heat survey. The temperature data obtained can be logged directly to a fixed or floppy disk.

Also, there are processes that require heating related to surface preparation that take place prior to the bonded doubler installation. The present process equipment is ideally suited for reasons of unparalleled temperature stability across the affected part as well as detailed reporting of temperature profiles.

The use of the present equipment can eliminate as much as 50% of the time required for the overall process to take place, not to mention that it can very well allow for aerospace structural repairs previously not considered due to the unavailability of technology suited for that field of expertise.

It is important to note that the present equipment is not limited to thick section repair, but is well suited to provide the heating requirements for simpler, less complex repairs, such as those found on wing surfaces and other areas with less complex underlying structure.

While embodiments of this invention have been illustrated in the accompanying drawings and described above, it will be evident to those skilled in the art that changes and modifications may be made therein without departing from the essence of this invention. All such modifications or variations are believed to be within the scope of the invention as defined by the claims appended hereto.

What is claimed is:

1. A heater cell for heating an area of a structure, comprising:
    a heat conductive monolithic block having an underside;
    a heating element embedded in the block, the heating element being in thermal contact with the block and having an electric connector extending outside the block to receive electric power;
    a temperature sensor mounted in the block and sensing a temperature thereof, the temperature sensor being in thermal contact with the block and having a connector extending outside the block to provide temperature data relative to the block; and
    means for detachably securing the block on the structure so that the underside of the block gets and remains in thermal contact with the area to be heated of the structure.

2. A heater cell according to claim 1, wherein the means for detachably securing comprise:
    a heat conductive pad mounted on the underside of said monolithic block, said heat conductive pad having opposite top and bottom surfaces and a hole extending from the top surface to the bottom surface to form a vacuum chamber; and
    a vacuum channel having an opening in the underside of the monolithic block for communication with the vacuum chamber, the vacuum channel being in communication with a tube extending outside the cell to receive a vacuum pressure causing the cell to adhere to the pad and the pad to adhere to the structure by suction.

3. A heater cell according to claim 2, wherein the pad is made of a compliant material.

4. A heater cell according to claim 1, wherein the heating element comprises a number of resistors.

5. A heater cell according to claim 1, wherein the block has a substantially square thin shape.

6. A heater cell according to claim 1, wherein the block is made of metal.

7. A heater system for controllably heating an area of a structure, comprising:
    a heater cell including:
        a heat conductive monolithic block having an underside;
        a heating element embedded in the block, the heating element being in thermal contact with the block and having an electric connector extending outside the block to receive electric power;
        a temperature sensor embedded in the block and sensing a temperature thereof, the temperature sensor being in thermal contact with the block and having a connector extending outside the block to provide temperature data relative to the block; and
        means for detachably securing the block on the structure so that the underside of the block gets and remains in thermal contact with the area to be heated of the structure;
    heater power supply means for supplying the electric power to the heating element of the heater cell in response to a control signal, the power supply means having an input to receive the control signal, and an output connected to the electric connector of the heating element;
    control means for operating the heater power supply means based on control data and for relaying the temperature data provided by the temperature sensor, the control means having an input/output port for receiving the control data and transmitting the temperature data, an output connected to the input of the heater power supply means to transmit the control signal thereto depending on the control data, and an input connected to the connector of the temperature sensor of the heater cell to receive the temperature data therefrom; and
    computer means for processing the temperature data and instructing the control means based on preprogrammed instructions in respect with the temperature data, the computer having an input/output port connected to the input/output port of the control means to receive the temperature data therefrom and transmit the control data thereto according to the preprogrammed instructions.

8. A system according to claim 7, further comprising additional heater cells identical to said heater cell, to heat other areas of the structure; and wherein:
    the heater power supply means have additional outputs connected to the electric connectors of the heating elements of the additional heater cells to supply electric power thereto in response to respective additional control signals, the input of the heater power supply means being configured to receive the additional control signals;
    the control means have additional inputs connected to the connectors of the temperature sensors of the additional heater cells to receive the temperature data therefrom, the output of the control means being configured to transmit the additional control signals to the input of the heater power supply means depending on the control data, and the input/output port being configured to transmit the additional temperature data; and
    the input/output port of the computer means is configured to receive the additional temperature data from the input/output port of the control means.

9. A system according to claim 8, wherein the preprogrammed instructions carry out comparisons between the temperature data provided by the heater cells and respective preset desired temperature values for the areas, and produce the control data to cause the control means to produce the control signals when the temperature data represent temperatures lower than the desired temperature values.

10. A system according to claim 8, further comprising:
    additional temperature sensors to provide additional temperature data relative to the areas or adjacent areas thereto;
and wherein:
    the control means have second inputs to receive the additional temperature data from the additional temperature sensors, the input/output port of the control means being configured to transmit the additional temperature data provided by the additional temperature sensors to the computer;

the input/output port of the computer means is configured to receive the additional temperature data derived from the additional temperature sensors for processing by the computer means.

11. A system according to claim 10, wherein the additional temperature sensors comprise thermocouples.

12. A system according to claim 8, further comprising:

a vacuum pump having an input for receiving a vacuum control signal, and vacuum ports to produce vacuum pressures in response to the vacuum control signal; and wherein:

the means for detachably securing of each heater cell comprise a heat conductive pad having opposite top and bottom surfaces and a hole extending from the top surface to the bottom surface to form a vacuum chamber; and a vacuum channel having an opening in the underside of the block for communication with the vacuum chamber, the vacuum channel being in communication with a tube extending outside the pad and connected to one of the vacuum ports of the vacuum pump to receive the vacuum pressure therefrom causing the cell to adhere to the pad and the pad to adhere to the structure by suction;

the control means have a vacuum control output to produce the vacuum control signal according to the control data; and the computer means is configured to operate the vacuum pump via the control means according to the preprogrammed instructions setting the control data.

13. A method of controllably heating areas of a structure, comprising the steps of:

placing a heater cell in each area, the heater cell including:
a heat conductive monolithic block having an underside;

a heating element embedded in the block, the heating element being in thermal contact with the block and having an electric connector extending outside the block to receive electric power;

a temperature sensor embedded in the block and sensing a temperature thereof, the temperature sensor being in thermal contact with the block and having a connector extending outside the block to provide temperature data relative to the block; and means for detachably securing the block on the structure so that the underside of the block gets and remains in thermal contact with the area to be heated of the structure;

monitoring the temperature data provided by each heater cell;

comparing the temperature data with desired temperatures values for the areas respectively; and supplying the electric power to the heating elements of the heater cells individually depending on whether the temperature data represent temperatures lower than the desired temperature values for the areas as a result of the step of comparing.

14. A method according to claim 13, wherein the areas are all adjacent or close to one another.

15. A method according to claim 13, wherein some of the areas intersect with other ones of the areas.

* * * * *